Dec. 18, 1956  A. BURI  2,774,381
DEVICE FOR REDUCING PRESSURE INCREMENTS IN A PIPELINE
CARRYING A FLUID UNDER PULSATING PRESSURE
Filed July 10, 1953
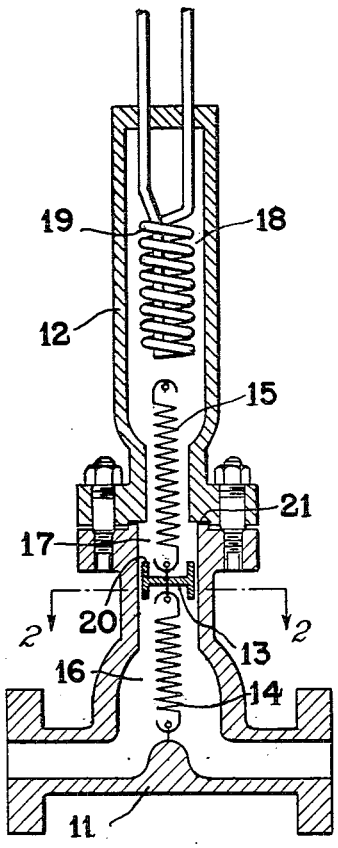
Fig.1.
Fig.2.
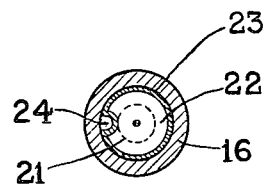
Fig.3.
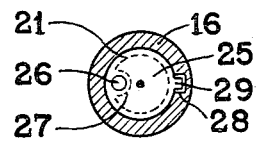
Fig.4.
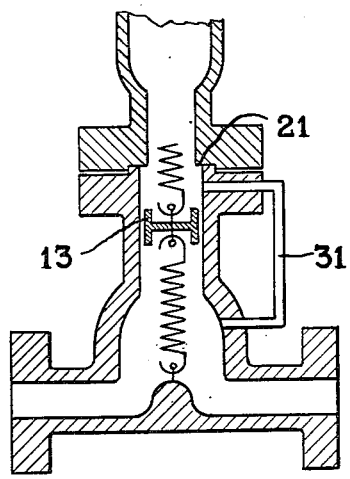
Fig.5.
INVENTOR.
Alfred Buri
BY
K. H. Mayr
ATTORNEY

United States Patent Office 2,774,381
Patented Dec. 18, 1956

2,774,381

DEVICE FOR REDUCING PRESSURE INCREMENTS IN A PIPELINE CARRYING A FLUID UNDER PULSATING PRESSURE

Alfred Buri, Winterthur, Switzerland, assignor to Sulzer Freres, Societe Anonyme, Winterthur, Switzerland, a corporation of Switzerland Application July 10, 1953, Serial No. 367,336

Claims priority, application Switzerland July 12, 1952

7 Claims. (Cl. 138—31)

This invention relates to a device for reducing pressure increments in a conduit carrying a fluid under pulsating pressure, the said device being inserted between the conduit and a steam cushion chamber attached thereto. The principal features of the invention are a piston arranged to reciprocate within a short cylinder connecting the steam cushion chamber to the conduit, and at least one spring which tends to hold the piston in an intermediary position within the cylinder.

The fluid body which is to produce the steam cushion and the fluid passing through the conduit are preferably connected with each other over a relatively small cross-section. This can be readily accomplished by restricting the size of the piston in relation to the surrounding cylinder, so as to permit fluid to pass between the piston and the cylinder wall. Or the piston can be provided with a groove at the wall or with a boring. Another way of establishing the connection is to provide a by-pass of limited capacity. In either case, the connection must not be of a size permitting the intermingling of more than small amounts of fluid passing one side of the piston with fluid at the other side of the piston.

At the side toward the steam cushion the stroke of the piston is preferably terminated by a stop which, jointly with the piston, seals the steam cushion against the conduit in case of an undue pressure drop within the former. Whichever construction is used in order to establish communication between the conduit and the steam cushion chamber, this connection should be closed the moment the piston stroke is terminated by the aforesaid stop.

The invention is illustrated by the accompanying drawings, in which:

Fig. 1 is a longitudinal section of the device,

Fig. 2 is a cross-section at the line 2—2 in Fig. 1,

Figs. 3 and 4 are cross-sectional views of other embodiments of the piston shown in Fig. 1, and Fig. 5 is a sectional view of still another embodiment, comprising a by-pass.

Referring more particularly to Figs. 1 and 2, the conduit 11, carrying, say, water, is attached to either the suction side or the pressure side of a piston operated feed pump, not shown. In order to reduce, or to compensate for, the pressure pulsations of the pump, a cylinder 12, closed at its upper end and filled with water passing through the conduit, is attached to a T-joint 16 of the latter. A piston 13 is provided to separate fluid contained within the cylinder from fluid within the T-joint and the conduit. The piston, adapted to move up and down within the cylindrical section 17 of the T-joint, is ordinarily held, by means of the springs 14 and 15, in a position at about the middle of the cylindrical section 17. The springs permit the piston to freely floatingly move up and down, in response to pressure impulses acting upon it. Obviously, the intermediary position in which the piston normally is held, can also be attained by means of a weight load in lieu of one of the springs, or by any other means. As shown, the piston is so dimensioned that there is a small clearance between it and the guide formed by the cylindrical section 17 in order to provide a restricted passage which permits water, flowing through the conduit 11, to enter the flanged cylinder 12 in limited amounts.

The fluid contained within the flanged cylinder 12 is heated by means of a heating coil 19 extending into the upper part 18 of the flanged cylinder to evaporate part of the fluid in the cylinder 12. The so produced vapor steam cushion exerts a pressure upon the piston 13 which acts in opposition to the pressure exerted upon the piston by the fluid passing through the conduit. If now, for example, steam passes through the heating coil which is of a higher temperature than the temperature of saturated steam of a pressure equal to that of the water surrounding the heating coil, the steam which develops displaces the water surrounding the heating coil until the pump pressure again exceeds the pressure of the steam produced by the heating coil. For all practical purposes, the heat supplied to produce the steam cushion should be sufficient to also cover heat losses to the outside. These losses can be prevented to a great extent by means of a suitable insulation around the flanged cylinder 12 constituting the steam cushion chamber.

Inasmuch as the feeding stroke pressure of the boiler feed pump may exceed the steam pressure within the heating coil if the latter is fed, for example, from the superheater, it can happen that, if a break occurs in the heating coil, large amounts of feed water will enter the superheater, causing a serious breakdown in the operation. In order to avoid this danger, the lower end of the flanged cylinder 12 is constricted as shown at 21. This constriction provides a stop for the piston 13 which, when forced against this stop, jointly therewith forms a tight seal whenever the pressure of the steam cushion becomes unduly low. In such a case the fluid pressure within the conduit 11 forces the top 20 of the piston against the stop 21 whereby the piston 13, functioning as a non-return valve, prevents the passage of fluid alongside the piston from the conduit into the cylinder 12 and therefrom into the broken heating coil. With due consideration of the various construction possibilities in restricting the lower part of the flanged cylinder 12, the surface of the stop upon which the top 20 of the piston is to bear must always assure a satisfactory seal. If the steam cushion is to be produced by means of a fluid other than the fluid passing through the conduit, the piston should not be restricted in diameter, but be furnished in a size that closely fits into the cylindrical section 17.

The embodiment illustrated in Fig. 3 comprises a piston 22 dimensioned to fit the cylindrical section of the T-joint 16. In order to establish fluid communication between the conduit and the steam cushion chamber, the wall 23 of the piston is provided with a groove 24. As shown, the constriction of the flanged cylinder providing the stop 21 must be sufficiently narrow to interrupt fluid communication through the groove upon the piston reaching its highest position.

Fig. 4 illustrates a construction in which the piston, consisting of a solid metal cylinder 25, is provided with a boring 26 to facilitate entry of fluid from the conduit into the steam cushion chamber. In order to close the boring whenever the steam cushion pressure reaches a minimum and the fluid pressure in the conduit forces the piston against the annular constriction 21, the latter has an interior projection 27 which acts as a closure for the boring as soon as the piston is in contact with the annular constriction. To prevent any rotation of the piston during its reciprocal movements which would disturb the alignment between the boring and the projection, the cylindrical section 16 is grooved as shown at 28 to admit the guide edge 29 fitted to the piston.

The construction shown in Fig. 5 includes a by-pass 31 to establish fluid communication between the conduit and the steam cushion chamber in the presence of a piston 13 closely dimensioned to the cylindrical part of the T-joint 16. The feed opening of the by-pass is near the bottom of the T-joint and the discharge opening is just below the stop 21, so that the piston, when resting against the stop, blocks the discharge.

The foregoing description is to be understood as illustrating, but in no way limiting, the scope of the invention.

I claim:

1. A device for reducing pressure increments in a conduit carrying a fluid under pulsating pressure, comprising, in combination, a vapor cushion chamber, means for producing a vapor cushion within said chamber, a hollow cylinder connecting said chamber with the conduit, a piston adapted to reciprocate within said cylinder, means affording a restricted fluid communication between the conduit and said vapor cushion chamber, and means connected with said piston for supplying forces adapted to freely floatingly retain said piston in middle position within said cylinder.

2. A device as defined in claim 1 in which said means connected with said piston for retaining same in a middle position are constituted by weak springs which do not substantially resist movement of the piston by the pressure increments, the resistance to movement of said piston by pressure increments being produced by the vapor cushion.

3. A device as defined in claim 1 in which said vapor cushion chamber has a cylindrical portion adjacent to said cylinder, the diameter of said portion being smaller than that of said cylinder and of said piston for forming an annular abutment for said piston, enabling the latter to form a seal between said cylinder and said vapor cushion chamber when said piston abuts against said abutment due to excessive pressure increments in the conduit.

4. A device as defined in claim 1 in which the diameter of said piston is smaller than the diameter of said cylinder for affording the restricted fluid communication between the conduit and said chamber.

5. A device according to claim 1 in which said piston fits closely into said cylinder and said means affording a restricted fluid communication is formed by a groove in the outside wall of said piston.

6. A device according to claim 3 in which said piston fits closely into said cylinder, said piston having an eccentric boring, an interior projection extending from the said annular abutment for closing said boring when said piston abuts against said abutment, a guide edge laterally projecting from the piston, and a groove in the interior wall of the said cylinder for receiving said guide edge.

7. A device as defined in claim 3 in which said means affording a restricted fluid communication is formed by a bypass conduit interconnecting the interior of the conduit carrying a fluid under pulsating pressure and the interior of said cylinder and terminating in the latter adjacent to said abutment for closing the bypass conduit by said piston when said piston abuts against said abutment.

References Cited in the file of this patent

UNITED STATES PATENTS

| Number | Name | Date |
|---|---|---|
| 942,666 | Romstaedt | Dec. 7, 1909 |
| 1,512,736 | Aldrich | Oct. 21, 1924 |
| 1,536,531 | Schermann | May 5, 1925 |
| 2,033,839 | Lawson | Mar. 10, 1936 |
| 2,081,799 | Doran | May 25, 1937 |
| 2,315,179 | Allender | Mar. 30, 1943 |
| 2,417,256 | Kremiller | Mar. 11, 1947 |
| 2,592,613 | Snyder | Apr. 15, 1952 |